July 16, 1946.　　　　S. W. SEELEY　　　　2,404,196
RADIO BEACON SYSTEM
Filed April 30, 1940

INVENTOR.
STUART W. SEELEY
BY
ATTORNEY.

Patented July 16, 1946

2,404,196

UNITED STATES PATENT OFFICE 2,404,196

RADIO BEACON SYSTEM

Stuart W. Seeley, Bayside, N. Y., assignor to Radio Corporation of America, a corporation of Delaware Application April 30, 1940, Serial No. 332,547

10 Claims. (Cl. 250—11)

The present invention relates to radio beacon systems and, more particularly, to a novel type of transmitting antenna for use in such system.

An object of the present invention is to provide an improved radio beacon system.

Still another object is to provide a system for determining the azimuthal direction of a transmitter from a receiver more efficiently than by prior methods or means.

Another object of the present invention is to provide a beacon radiating system for radiating simultaneously a plurality of waves of different frequencies without interaction.

Still a further object of the present invention is the provision of a beacon radiating system for radiating simultaneously a plurality of waves which are similarly effected by ground reflections.

The present invention contemplates simultaneously radiating from a transmitting location an unmodulated spiral field and an unmodulated circular field of the same polarization and of slightly different frequencies. The phase of the resultant beat note in a receiver for said signals is then a function of the azimuthal direction of the receiver from the transmitter.

In accordance with the present invention I also provide a third transmitter which radiates a field modulated by the different frequency between the first two mentioned fields and which is also received at the receiver. A phase meter is provided for comparing the phase of the received demodulated different frequency and the beat note between the received circular and spiral fields. The phase meter may be directly calibrated in degrees to indicate the azimuthal direction from some arbitrarily chosen direction at the transmitting location.

As a further feature of the present invention there is included a novel form of transmitting antenna which simultaneously radiates the heretofore described circular and spiral fields with the same polarization and without interaction therebetween. Since the same polarization is used, ground reflections affect both fields alike. One very important source of error existing in previously known systems is thus eliminated.

Figure 1:
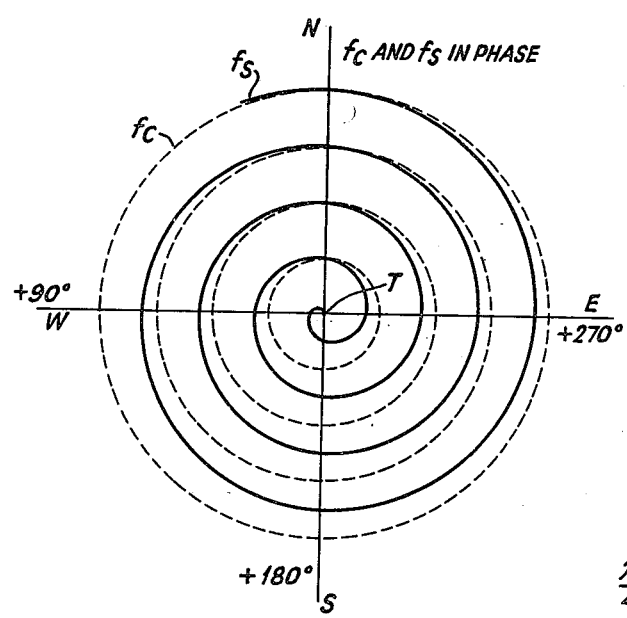
Figure 2:
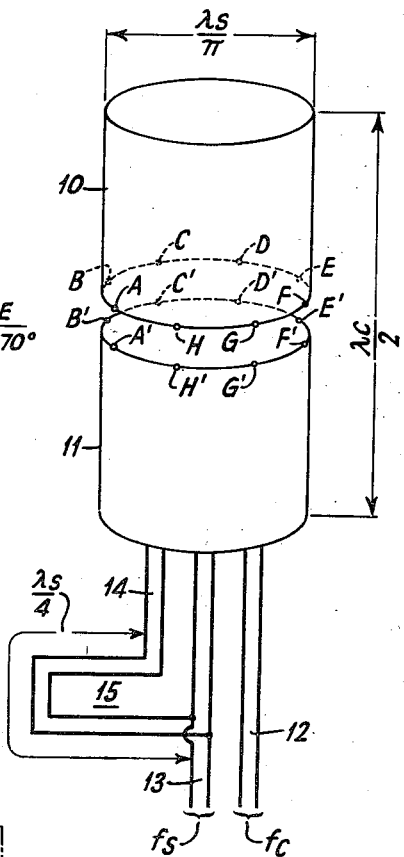
Figure 3:
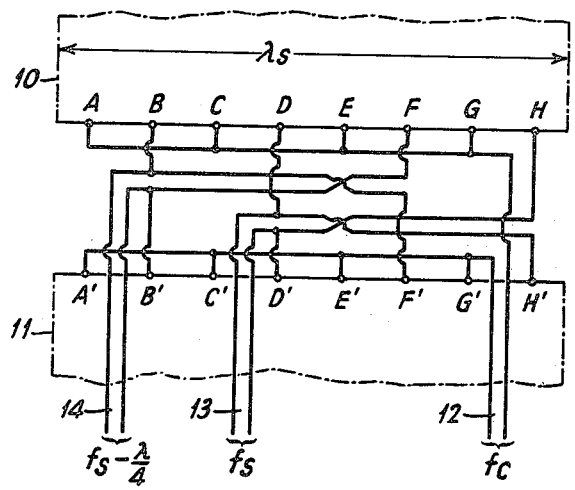

Further objects, features and advantages of the present invention will become apparent from the following detailed description which is accompanied by a drawing, in which Figure 1 is a diagram useful in explaining the types of field radiated from a transmitter in accordance with my invention; Figure 2 is a perspective view of an antenna constructed according to my invention with certain connections eliminated for the sake of clarity, and Figure 3 is a developed portion of the antenna shown in Figure 2 wherein all of the connections are clearly shown.

Referring, now, to Figure 1, the cardinal compass directions are indicated by lines N, S and E, W. At their intersection is located a transmitter which is indicated by the reference letter T. The transmitter simultaneously radiates a circular field indicated by dotted lines $f_c$ and a spiral field $f_s$ indicated by the solid spiral line. The frequencies of the two signals radiated by the transmitter differ by a small amount, for instance, 60 cycles.

As will clearly be seen from an inspection of the drawing, at a particular instant the phase of the resultant detected beat note in a receiver at any point around the transmitter at T will be a function of the azimuthal direction from the transmitter being simultaneously different at each location. For instance, along the line W, T the spiral field leads the circular field by 90 degrees while along the line E, T it leads the circular field by 270 degrees. The pattern shown in Figure 1 may be considered to rotate at a rate corresponding to the difference in frequency of the spiral and circular fields. Along line N, T both radiations are in phase and on the line S, T the radiations are 180 degrees out of phase. If a third transmitter, not shown, which is modulated by the different frequency between $f_c$ and $f_s$ is simultaneously received at any receiving location with the two frequencies $f_c$ and $f_s$, the direction between the receiving location and the transmitter T can be directly read on a phase meter. The phase reading will be the number of degrees in azimuthal direction from the starting direction, arbitrarily chosen as north in this example, at which the signals are being received. Since the present invention is not dependent upon the form of phase meter used, any conveniently available meter may be used. As an example, the meter might take the form of a "Selsyn motor" with the pointer for the scale reading on the shaft of the motor. The detected modulation from the third above mentioned transmitter may be applied to the field of the "Selsyn motor" and the detected beat note applied directly to the armature. Then the armature takes up a stationary position with the pointer indicating the phase difference between the two applied low frequency currents which will also be the azimuthal direction from the transmitters to a receiving point.

As far as I am aware, there cannot be a uniform circular field of horizontally polarized radiation simultaneously at all azimuthal directions. All of the previously known antennas, examples of which include crossed dipoles, turnstiles, etc., which radiate horizontally polarized waves uniformly in all horizontal directions must of necessity produce spiral fields. On the other hand, vertically polarized radiation can be of either the spiral or circular type in all horizontal directions. For instance, a single vertical dipole over an idealized earth surface will radiate a perfectly uniform circular field in all horizontal directions. Likewise, a vertically polarized spiral field may be radiated in all horizontal directions with perfect uniformity by utilizing the antenna of my invention.

Furthermore, in the radio beacon system, as described above, it is desirable that both the spiral and circular fields be radiated from the same antenna. It is not necessary that either the absolute or relative intensities of the two waves be kept uniform at the receiving antenna, but it is very essential that the relative phase after considering reflection, etc., be accurately maintained since the phase of the detected beat note is a direct function of the instantaneous phase of the two received waves.

As far as the third above mentioned field is concerned, no specific phase, direction, amplitude or frequency need be maintained, except that the modulation must be in exact phase and frequency with the beat note in a predetermined direction from the two first mentioned fields. The radiator of the refence phase or third field need not be at the same location or even in the same direction from the receiver as the radiator of the fields $f_s$ and $f_c$ as long as the receiver can receive some signal therefrom.

If the beat note between the spiral and circular fields is fixed at a low enough value it is possible to utilize the third transmitter for voice modulation at the same time it is transmitting the refence phase. Since the voice modulation frequencies appear in only one portion of the phase meter the meter would entirely disregard them.

Since, as I have pointed out above, it is necessary that the two fields, which differ in frequency by a discrete amount, both have the same polarization and both be radiated from the same location in order that ground reflections, etc., act the same on both, I have shown in Figure 2 an antenna which is capable of simultaneously radiating both a circular field and a spiral field with the same vertical polarization.

The antenna, constructed according to Figure 2, consists of a pair of circular conductive drums or cylinders 10 and 11, which are mounted in axial alignment with their axes vertical. The spacing between the two drums is very small, for example, 1/250 of the wavelength. The drums or cylinders each have a length approximately equal to one-quarter of the length of the wave which is to be radiated as a circular field. For this wave the antenna acts as a vertical half wave dipole antenna. The diameter of each of the drums is equal to $$\frac{\lambda_s}{\pi}$$

where $\lambda_s$ is the wavelength of the spiral field. The circumference is therefore equal to the length of the wave which is to be radiated as a spiral field and in operation each cylinder has a continuous rotating charge distribution thereon with voltage maxima and minima traveling around the top of 10 and the bottom of 11 in the same direction when viewed from one end, thus radiating a spiral field. The antenna is energized from a pair of transmitters through transmission lines 12 and 13, the transmission line 12 carrying the frequency for the circular field and 13, that for the spiral field. At any convenient point along transmission line 13 is connected a third transmission line 14. Transmission line 14 has a phase quadrature loop 15 therein so that above the loop there is a difference of a quarter of the wavelength in the waves carried by lines 13 and 14. The three transmission lines 12, 13 and 14 are connected to radiating drums 10 and 11 at points A to H and A' to H'. The connections have been eliminated from Figure 2 in order to avoid confusion and for their complete disclosure reference may be had to Figure 3 wherein the inner surfaces of drums 10 and 11 along their adjacent edges are shown as being developed into flat planes. Here the connections are clearly shown. The frequency $f_c$ carried by transmission line 12 is directly applied to points A, C, E and G in one phase and to points A', C', E' and G' in the other phase. The drums 10 and 11 are, therefore, simultaneously energized as a half wave doublet. For the spiral field the drums 10 and 11 are energized from transmission line 13 at points D and H' in phase and at points D' and H 180 degrees out of phase with points D and H'. D, H and D', H' are at opposite ends of diameters of their respective cylinders. At points 90 spatial degrees away from these points transmission line 14 is connected at points B and B' directly and at points F and F' through phase reversing connections. It should be clearly understood that the actual connections to the antenna of Figure 2 at points A to H and A' to H' from the transmission lines 12, 13 and 14 are of equal length. The connecting wires are preferably arranged substantially radially from the transmission lines near the vertical axis of the antenna.

It will be seen from an inspection of Figures 2 and 3 that a perfect bridge is formed and reaction between the two systems generating frequencies $f_s$ and $f_c$ is almost entirely eliminated even though the antenna radiates both fields at one and the same time.

While I have particularly shown and described several modifications of my invention, it is to be particularly understood that my invention is not limited thereto but that modifications may be made within the scope of my invention.

I claim:

1. In a radio beacon system, a vertical dipole antenna, means for so energizing said antenna that a uniform circular field is radiated and means for separately and simultaneously so energizing said antenna that a uniform spiral field is radiated.

2. In a radio beacon system, a vertical dipole antenna, means for so energizing said antenna that a uniform circular field is radiated and means for separately so energizing said antenna that a uniform spiral field is radiated.

3. In a radio beacon system, a radiator comprising a pair of coaxially arranged vertical conductors, means for energizing said conductors in an opposing phase relationship whereby a uniform circular field is radiated and means for simultaneously so energizing said conductors that a wave is caused to travel circumferentially about said conductors whereby a spiral field is radiated.

4. In a radio beacon system, a radiator comprising a pair of coaxially arranged vertical conductors, said conductors each having a length equal to a quarter of the length of a first wave to be transmitted, means for energizing said conductors with said wave in an opposing phase relationship whereby a uniform circular field is radiated, said conductors each having a circumference equal to the length of a second wave to be transmitted, means for simultaneously so energizing said conductors with said second wave that a spiral field is radiated.

5. In a radio beacon system, a radiator comprising a pair of coaxially arranged vertical conductive cylinders, said cylinders each having a length equal to a quarter of the length of a first wave to be transmitted, means for energizing said cylinders with said wave in an opposing phase relationship whereby a uniform circular field is radiated, said cylinders each having a circumference equal to the length of a second wave to be transmitted, and means for applying said second wave to said cylinders in a similarly progressing phase relationship around each of said cylinders.

6. In a radio beacon system, a radiator comprising a pair of coaxially arranged vertical conductive cylinders, said cylinders each having a length equal to a quarter of the length of a first wave to be transmitted, means for energizing said cylinders with said wave in an opposing phase relationship whereby a uniform circular field is radiated, said cylinders each having a circumference equal to the length of a second wave to be transmitted, and means for applying said second wave to adjacent edges of said cylinders circumferentially progressing at a plurality of points along said edges, the phase of said second wave at said points being progressively different around said circumference.

7. In a radio beacon system, a radiator comprising a pair of coaxially arranged vertical conductive cylinders, said cylinders each having a length equal to a quarter of the length of a first wave to be transmitted, means for energizing said cylinders with said wave in an opposing phase relationship whereby a uniform circular field is radiated, said cylinders each having a circumference equal to the length of a second wave to be transmitted, and means for applying said second wave to adjacent edges of said cylinders in a similar phase relationship and at a number $n$ points along said edges the phase relationship between successive points being equal to $$\frac{360}{n}$$

degrees.

8. In a radio beacon system, a radiator comprising a pair of coaxially arranged vertical conductive cylinders, said cylinders each having a length equal to a quarter of the length of a first wave to be transmitted, a first transmission line for energizing said cylinders with said wave in an opposing phase relationship whereby a uniform circular field is radiated, said cylinders each having a circumference equal to the length of a second wave to be transmitted, a second transmission line for energizing said cylinders with said second wave in a circumferentially progressing phase relationship around said cylinders, said transmission line being connected to adjacent edges of said cylinders at one side thereof and at the opposite side in a reversed phase relationship, a third transmission line connected to said second line and similarly connected to said cylinders at points intermediate the points of connection of said second line.

9. In a radio beacon system, a radiator comprising a pair of coaxially arranged vertical conductive cylinders, said cylinders each having a length equal to a quarter of the length of a first wave to be transmitted, a first transmission line for energizing said cylinders with said wave in an opposing phase relationship whereby a uniform circular field is radiated, said cylinders each having a circumference equal to the length of a second wave to be transmitted, a second transmission line for energizing said cylinders with said second wave, said transmission line being connected to adjacent edges of said cylinders at one side thereof and at the opposite side in a reversed phase relationship, a third transmission line connected to said second line and similarly connected to said cylinders at points intermediate the points of connection of said line, the length of said third line and said second line from their junction to the points of connection to said cylinders differing by a quarter of the length of said second wave.

10. In a radio beacon system, a radiator comprising a pair of coaxially arranged vertical conductive cylinders, said cylinders each having a length equal to a quarter of the length of a first wave to be transmitted, a first transmission line for energizing said cylinders with said wave in an opposing phase relationship whereby a uniform circular field is radiated, said cylinders each having a circumference equal to the length of a second wave to be transmitted, a second transmission line for energizing said cylinders with said second wave, said transmission line being connected to adjacent edges of said cylinders at one side thereof and at the opposite side in a reversed phase relationship, a third transmission line connected to said second line and similarly connected to said cylinders at points intermediate the points of connection of said line, the length of said third line and said second line from their junction to the points of connection to said cylinders differing by a quarter of the length of said second wave, said first transmission line being connected to the adjacent edges of said cylinders at a plurality of points intermediate the points of connection of said second and third transmission lines.

STUART W. SEELEY.